United States Patent

Matuska

[15] 3,700,199

[45] Oct. 24, 1972

[54] QUICKLY REMOVABLE, PIVOTAL, AND SNUBBED STORAGE BIN

[72] Inventor: James E. Matuska, 641 West Ewing, Seattle, Wash. 98119

[22] Filed: Oct. 6, 1970

[21] Appl. No.: 78,585

Related U.S. Application Data

[62] Division of Ser. No. 744,933, July 15, 1968.

[52] U.S. Cl. ..................248/292, 244/118, 248/240
[51] Int. Cl. ............................................A47b 46/00
[58] Field of Search............248/291, 292, 293, 240.3, 248/240.1, 240; 312/248, 327, 328; 244/118, 129

[56] References Cited

UNITED STATES PATENTS

| | | | |
|---|---|---|---|
| 2,551,305 | 5/1951 | Tompkins...................312/328 |
| 2,523,872 | 9/1950 | McCloskey............312/248 X |
| 1,753,357 | 4/1930 | Wood et al. ............312/248 X |
| 2,315,927 | 4/1943 | Breck .....................312/248 X |
| 3,162,497 | 12/1964 | Boswinkle et al..........312/248 |
| 1,057,541 | 4/1913 | Gettini....................312/248 X |

Primary Examiner—I. Franklin Foss
Attorney—Theron H. Nichols

[57] ABSTRACT

An easily and quickly removable, pivotal, and snubbed storage bin, such as but not limited to aircraft passenger carry-on luggage having axially retractable pivotal pins extendible from the bin into recesses in support structure, such as but not limited to an aircraft passenger transport, in a nonrotatable fitting and a snubber pivotally connected between the bin and the pin for snubbing relative movement between the bin and its pivot pin and accordingly between the bin and the support structure.

Also incorporated in the quickly removable pivotal rigid structure is a quickly retractable and snubbing pivot pin mechanism comprising an extendible means, snubbing means, and link means nonrotatably and slideably connected to the extendible bin means and pivotally connected to the snubbing means.

4 Claims, 5 Drawing Figures

INVENTOR.
James E. Matuska
BY
Theron H. Nichols
AGENT

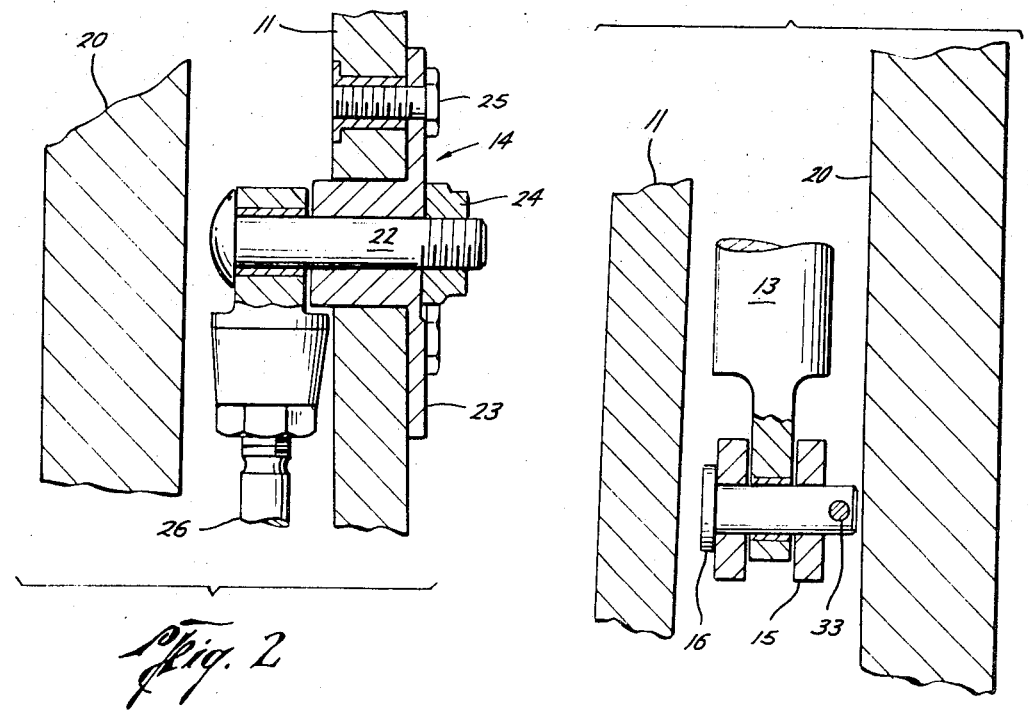
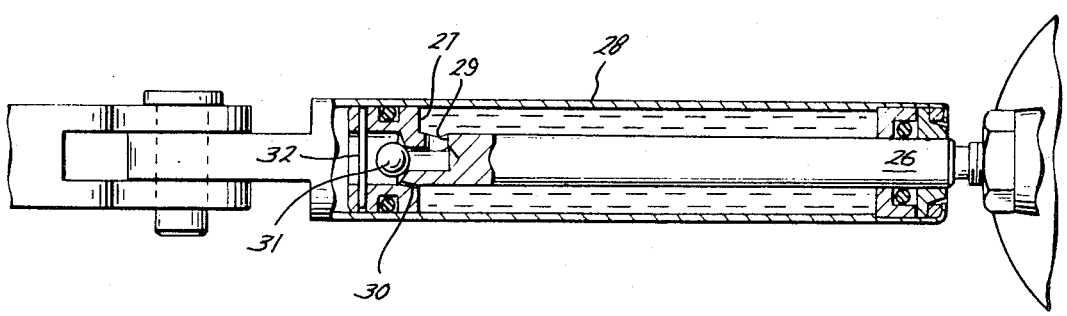

QUICKLY REMOVABLE, PIVOTAL, AND SNUBBED STORAGE BIN

This is a Division of Application Ser. No. 74,933 filed July 15, 1968.

BACKGROUND OF THE INVENTION

FIELD OF THE INVENTION

This invention is classified in Class 248, Subclass292, "Counterbalanced horizontal single joint adjustable supports."

SUMMARY OF THE INVENTION

This invention pertains to a new and novel storage bin which comprises a removable snubbing pivot pin at each side which pivotally support a storage bin so that any and free downward tilting movement of the bin for access thereof is shock absorbingly controlled upon release of a suitable latch, for example, and the fully loaded bin is only allowed to slowly tilt to fully opened position. But, while downward opening movement is efficaciously snubbed, the bin may be closed or pivoted back to its original horizontal position with no appriciable resistance from the snubber.

Likewise, the storage bin is quickly removable by mere inward pulling of knobs on the pivot pins for changing, cleaning, or repair of the storage bins.

Also is disclosed a quickly, retractable, and extendable snubbing pivot pin mechanism for forming a highly efficient pivot for incorporation with a storage bin, particularly one for aircraft passenger carry-on luggage, and for being mounted in a storage bin supporting structure, as in an aircraft passenger transport, adjacent the passengers.

Accordingly, the principal object of this invention is to provide a quickly removable pivotal structure that may be pivotally connected to a support structure with retractable pivot pins.

A further object of this invention is to provide a quickly and easily removable pivotal structure for pivotally mounting on a support structure with means for snubbing the pivotal movement between the two structures.

Another main object of this invention is to provide a storage bin that is quickly removable, pivotal, and snubbed in its pivotal movement about its pivotal mount.

Still another object of this invention is to provide a quickly removable, retractable, and snubbing pivot pin mechanism combined with a pivotal rigid structure for mounting in a cavity.

Other objects and various advantages of the disclosed quickly removable, pivotal, and snubbed, rigid structure apparent from the following detailed description, together with the accompanying drawings, submitted for purposes of illustration only and not intended to define the scope of the invention, reference being had for that purpose to the subjoined claims.

BRIEF DESCRIPTION OF THE FIGURES

The drawings diagrammatically illustrate by way of example, not by way of limitation, one form of the invention wherein like reference numerals designate corresponding parts in the several views in which:

FIG. 2 is a sectional view taken of 2—2 on FIG. 1;

FIG. 3 is a side view of the snubber of FIG. 1, with parts in section;

FIG. 4 is a sectional view taken at 4—4 on FIG. 1; and

DESCRIPTION OF THE PREFERRED EMBODIMENT

Figure 1:
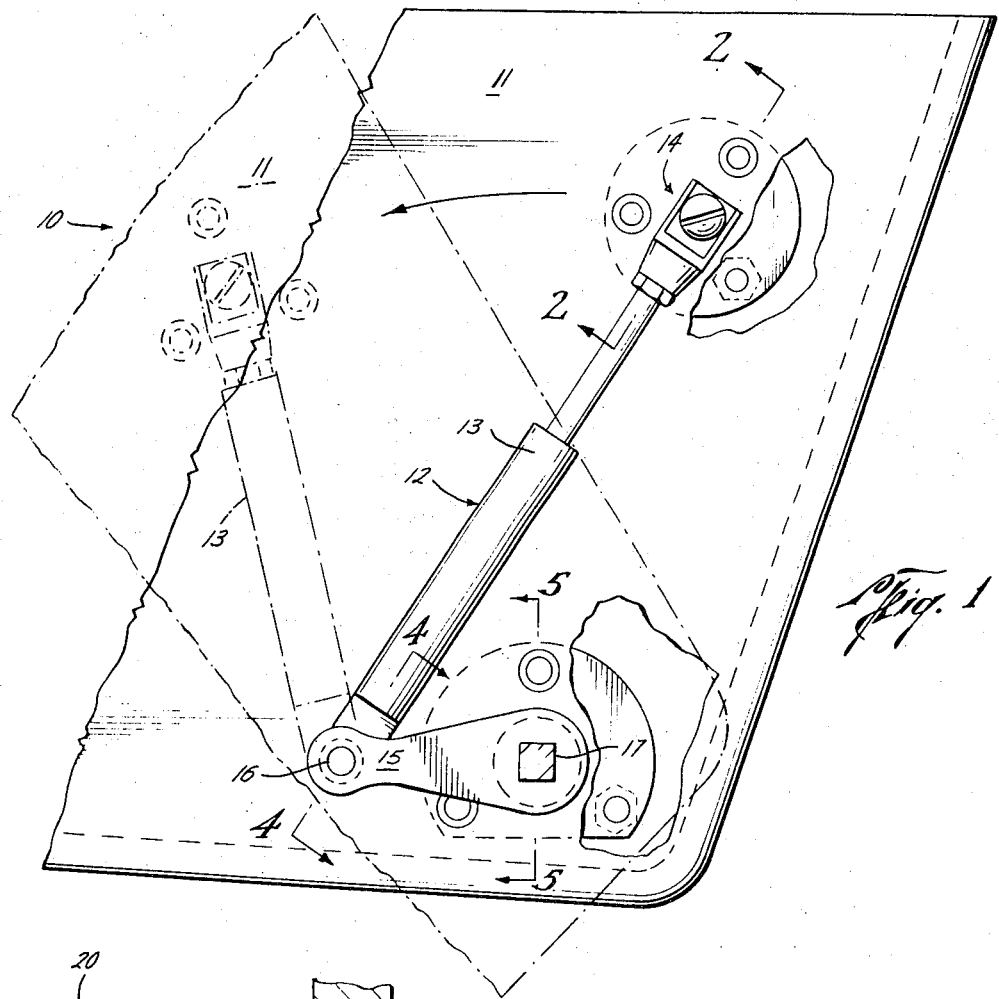
FIG. 1 is a side view, with parts in section, of the rear portion of the new storage bin shown in horizontal position in solid lines and in lowered unloading position in broken lines.

FIG. 1 illustrated, with parts in section for clarity of disclosure, a side view of the rear portion of the new and novel quickly removable, pivotal, and snubbed storage bin 10.

Pivotal bin 10, FIG. 1, comprises a storage bin 11 combined and mounted in a quickly retractable and snubbing pivot pin mechanism 12, one mechanism for each side. While each part of the two mechanisms are identical, each mechanism is the enantiomorphic analogue of the other.

Figure 5:
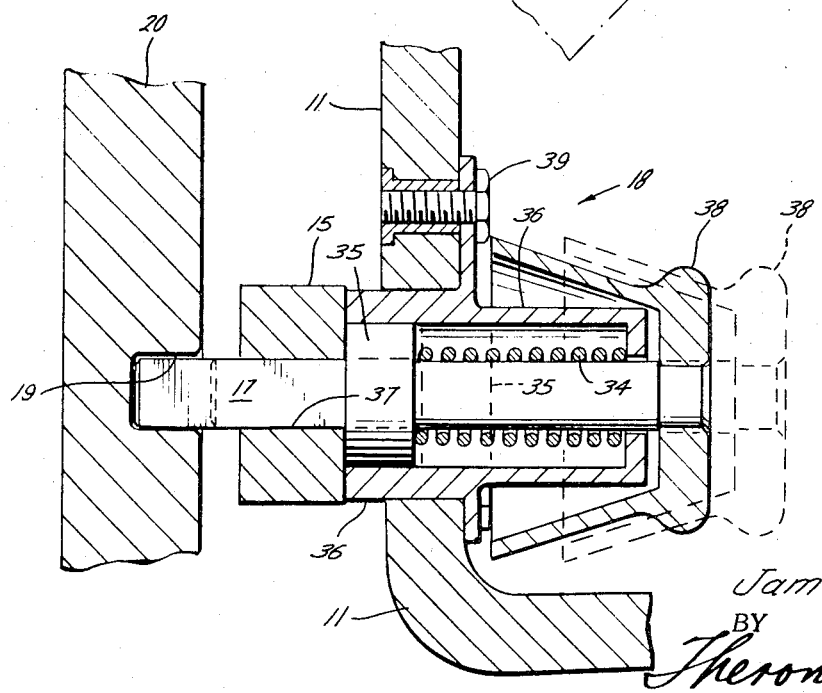
FIG. 5 is a sectional view taken at 5—5 on FIG. 1.

Each snubbing pivot pin mechanism 12, FIG. 1, comprises a snubber 13 pivotally connected at its upper end to the bin 11 with pivotal connection 14 and at its lower end to level 15 with pivot pin 16. A shaft or pivot pin 17 of pivot pin device 18, FIG. 5, is nonrotatably but axially slideable in lever 15. From there the shaft or pivot pin 17 protrudes into a recess 19 in wall 20 of the bin supporting structure.

SNUBBER PIVOTAL CONNECTION 14

Pivotal connection 14 FIGS. 1 and 2, for connecting another 13, FIG. 1, to a side wall of the storage bin 11 comprises pivot pin or bolt 22, FIG. 2, passing through a hole in the upper end of a piston rod 26 of the snubber, through a flange 23, and retained with nut 24, the flange being secured to the bin wall with screws 25.

SNUBBER 13

Hydraulic snubber 13, FIGS. 1 and 3, comprises the piston rod 26, FIG. 3, actuatable by piston 27 slideable in cylinder 28. Piston rod 26 has a large orifice and passage 29 and small orifice 30 for fluid to pass from one side of the piston to the other. A ball 11 is retained internally of piston 27 by pin 32, the ball plugging the large orifice and passage when the fluid slowly flows to the right as the snubber is compressed and shortened, as viewed in FIG. 3, whereas fluid flow to the left is fast and friction free as the piston rod extends.

FIG. 4, a section taken at 4 — 4 on FIG. 1, illustrates the pivotal connection of the lower end or cylinder 28, FIG. 4, of the snubber 13 and the left end of lever 15, FIG. 1, the latter being pivotally connected with pin 16, FIG. 4, passing through both and retained with locking pin or key 33.

PIVOT PIN DEVICE 18

FIG. 5, a section at 5 — 5 on FIG. 1 illustrate on of two pivot pin devices 18 of the overall snubbing pivot pin mechanism. Pin device 18 comprises a compression spring 34 around an intermediate portion of pin device shaft or pivot pin 17 compressed between an annular ridge 35 on the shaft and a wall surface internally of flange 36. The outer portion of shaft or pivot pin 17 is rectangular shaped and to the left of the ridge 35, FIG. 5, protruding from the flange 36, through a rectangular hole 17 in the lever 15, and terminating in the recess 19 in the bin supporting structure wall 20. The inner or right end of shaft 17 or pivot pin is round beginning with the annular ridge and extends internally of the bin to a round hole in the flange 36 and the shaft extends further therefrom the hole where a knob 38 is fixedly secured to the shaft inner end. Ridge 35, with its round outer surface, slideably actuates in a cylindrical cavity in the flange 36 enclosing the spring 34. Suitable bolts 39 secure the flange 36 to a side wall of the bin 11.

Thus in operation of the pivot pin device 18, compression spring 34 spring urges in an axial direction the square end of pivot pin 17 out of its flange 36, through lever 15, and into bin supporting structure wall 20, whereby while pivot pin 17 is prevented from rotating, the storage bin 11 and flange 36 may freely pivot and rotate about the pivot pin 17. Inward manual pulling of the knobs 38 of both pivot pin devices on each side of the storage bin compresses spring 34 to permit inward movement of the pivot pins 17, to the left in FIG. 5, a distance of slightly over the depth of the recess 19 of the supporting structure wall 20, whereby the storage bin may be easily and quickly removed for cleaning, changing, repair, etc.

OPERATION OF THE QUICKLY REMOVABLE, PIVOTAL, AND SNUBBED STORAGE BIN

With a snubbing pivot pin mechanism 12 attached to both sides of the storage bin 11 at the rear thereof and with release of latch (not shown) for supporting the front portion of the bin, the bin front portion immediately tends to drop down with all its weight to an accessible position for aircraft passengers, for example, to retrieve their belongings and/or store more luggage in the storage bin before raising it back to stored position.

As the bin drops, pivots, or rotates counterclockwise about the pivot pin 17, FIG. 1, which shaft is non-rotatably fitted in the supporting structure recess 19, the lever 15 is held stationary relative to bin support structure 20, and the snubber 13 contracts as it pivots about pivot pin 16, when the bin pivotal connection 14 moves toward pin 16 as it rotates about pivot pin 17 to the broken line position illustrated in FIG. 1. Contraction of the snubber 13 is resisted as the piston 27, FIG. 3, moves to the left, the ball plugs the large orifice and passage 29, and fluid flows only through small orifice 30.

Then when the storage bin is emptied or refilled and raised back up to the normal horizontal position, the snubber is easily extended with negligiable resistance due to the snubber fluid passing through both the large orifice and passage and the smaller orifice in the piston as the snubber 13, FIG. 1, is actuated from the broken line position to the right to the solid line, horizontal position.

Thus it will be seen that the instant storage bin is quickly removable, pivotal, and snubbed in a manner which meets each of the objects set forth hereinbefore.

Having specifically described my invention, I do not desire to confine myself to the specific details of the constructional example herein shown and described as it is apparent that various modifications may be resorted to without departing from the broad principles of the invention as indicated by the scope of the following claims.

I claim:

1. A quickly removable pivotal rigid structure, support structure for the rigid structure, and means for pivotally and removably mounting the rigid structure on the support structure, said means comprising,
    a. pivot pin means extending from said rigid structure into a recess in said support structure whereby said rigid structure is pivotal about said pin means.
    b. said pivot pin means being retractable from said recess whereby said rigid structure is completely. easily, and quickly removable from said support structure, (rigid structure as recited wherein,)
    c. snubber means is connected between said rigid structure and said pivot pin means for snubbing pivotal movement of said rigid structure relative to said pivot pin means,
    d. one end of said snubber means is pivotally connected to said rigid structure and
    e. the other end of said snubber means is non-rotatably connected to said pivot pin means whereby said rigid structure may be quickly and easily removed from said support structure.

2. A quickly removable pivotal rigid structure, support structure for the rigid structure, and means for pivotally and removably mounting the rigid structure on the support structure, said means comprising,
    a. pivot pin means extending from said rigid structure into a recess in said support structure whereby said rigid structure is pivotal about said pin means,
    b. said pivot pin means being retractable from said recess whereby said rigid structure is completely, easily, and quickly removable from said support structure, (rigid structure as recited in claim 1 wherein,)
    c. said recess comprises means for preventing rotational movement of said pivot pin means relative to said support structure, and
    d. snubber means fixedly connected to said pivot pin means for snubbing pivotal movement of said rigid structure relative to said support structure.

3. A quickly removable pivotal rigid structure, support structure for the rigid structure, and means for pivotally and removably mounting the rigid structure on the support structure, said means comprising, (rigid structure as recited in claim 1 wherein,)
    a. pivot pin means extending from said rigid structure into a recess in said support structure whereby said rigid structure is pivotal about said pin means,
    b. said pivot pin means being retractable from said recess whereby said rigid structure is completely, easily, and quickly removable from said support structure,
    c. said recess comprises means for preventing rotational movement of said pivot pin means therein, and
    d. snubber means fixedly connected to said pivot pin means for snubbing pivotal movement of said rigid structure relative to said pivot pin means.

4. A quickly, removable pivotal rigid structure, (as recited in claim 3 wherein) support structure for the rigid structure, and means for pivotally and removably mounting the rigid structure on the support structure, a. pivot pin means extending from said rigid structure into a recess in said support structure whereby said rigid structure is pivotal about said pin means,
b. said recess comprises means for preventing rotational movement of said pivot pin means therein,
c. snubber means fixedly connected to said pivot pin means for snubbing pivotal movement of said rigid structure relative to said pivot pin means,
d. the connection between said snubber means and said pivot pin means being a lever,
e. one end of said lever being slidable on said pivot pin means in an axial direction and non-rotatably mounted on said pivot pin means, and the other end of said lever being pivotally connected to said snubber means, and
f. said pivot pin means being retractable from said recess whereby said rigid structure is completely, easily, and quickly removable from said support structure.

* * * * *